July 28, 1959
M. RAMUN
2,896,963
DETACHABLE LOAD-BEARING SPRING AND AXLE
ASSEMBLY FOR VEHICLES
Filed March 15, 1956
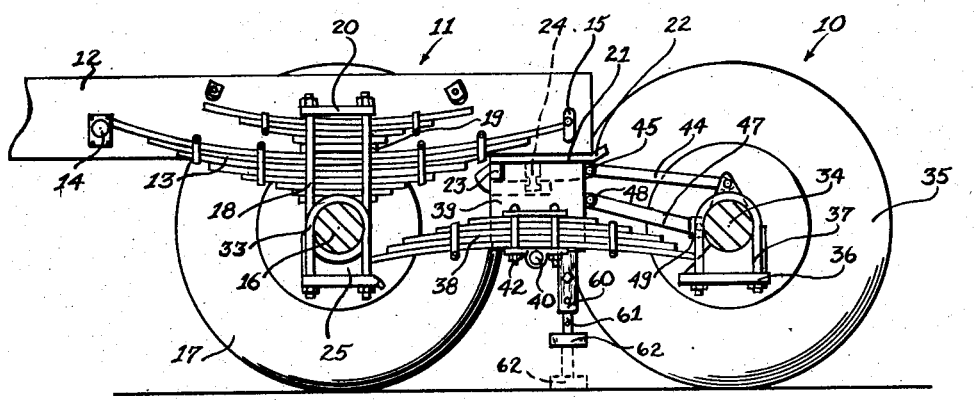
Fig. 1
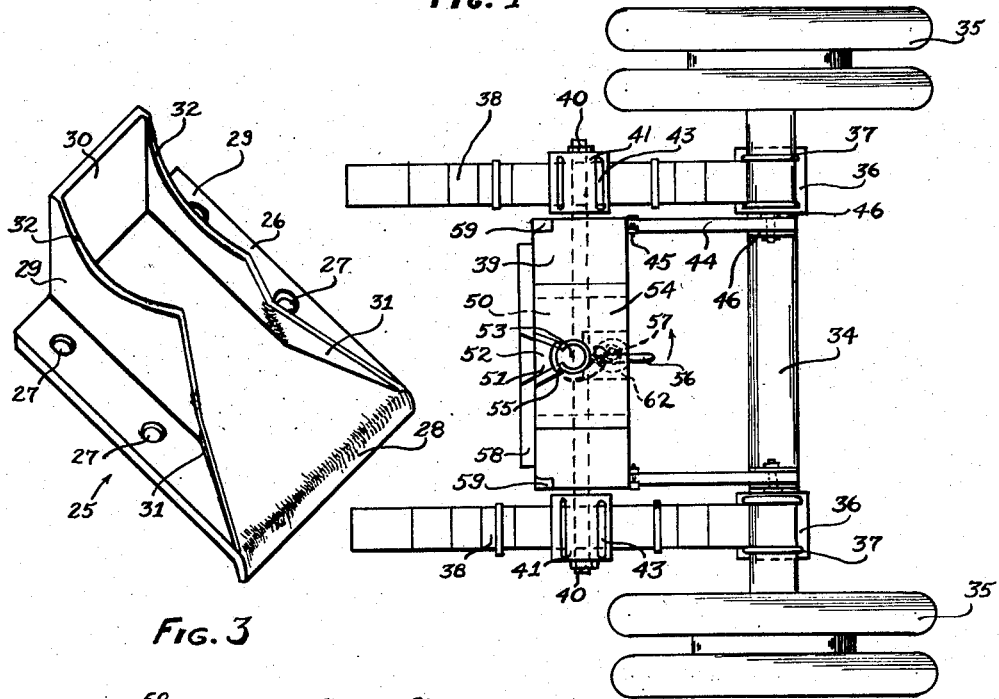
Fig. 3
Fig. 2
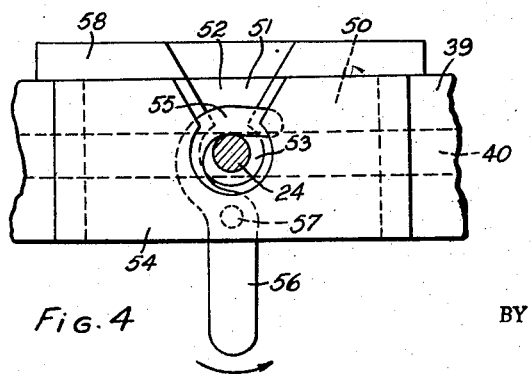
Fig. 4
INVENTOR
MICHAEL RAMUN
BY Francis J. Klempay
ATTORNEY United States Patent Office 2,896,963
Patented July 28, 1959

2,896,963

DETACHABLE LOAD-BEARING SPRING AND AXLE ASSEMBLY FOR VEHICLES

Michael Ramun, Youngstown, Ohio

Application March 15, 1956, Serial No. 571,799

11 Claims. (Cl. 280—104.5)

The present invention relates in general to an attachment for vehicles and more particularly to a new and novel detachable spring and axle assembly for improving the load-carrying capacities of trucks, trailers, or other such apparatus.

It is the primary object of the present invention to provide a detachable load-bearing spring and axle assembly which may be utilized with trucks or trailers, for example, to increase and make use of the inherent load-bearing capabilities of such apparatus. It should be well understood that the load capable of being supported by a truck or trailer is in many cases limited by the number of load-supporting spring and axle assemblies utilized although the frames and carrying area of such vehicles can generally accommodate a much greater load than the axle assemblies can support. This is particularly true when the material being transported has a relatively high density. In addition, many states have enacted laws to regulate the maximum load limits for trucks and trailers and these laws are based upon the number of axle assemblies employed. The effect of such laws is to further accentuate the dependance of the load-carrying capabilities of a vehicle on the number of axle assemblies provided. In the present invention I provide a detachable spring and axle assembly which may be attached to a truck or trailer in order that more efficient utilization of the inherent carrying capacities of such vehicles may be realized.

It is yet another object of the present invention to provide an auxiliary axle and spring assembly for vehicles which is easily attached and detached therefrom. I provide a fifth wheel assembly for coupling the vehicle to the spring and axle assembly and means for supporting the assembly in an upstanding position whereby the vehicle need only be backed into engagement with the fifth wheel assembly to be in operative relation with the auxiliary axle and spring assembly. As will be more fully apparent, the attachment and detachment operations may be carried out in a minimum of time.

A further object of the invention is to provide new and novel means for securing such a spring and axle assembly with respect to a vehicle whereby the assembly is positively restrained from any yawing or undue movement but yet is operative to support a substantial portion of the load carried by the vehicle.

A more specific object of the invention is to provide apparatus of the character described and having the characteristics outlined above which is easily constructed and is able to withstand rugged and sustained usage.

A further ancillary object of the invention is to provide a detachable load-bearing spring and axle assembly which can be utilized by existing vehicles and with only minor modifications and changes of the same.

These objects, as well as other objects and advantages of the invention, will be better understood upon consideration of the following detailed specification and accompanying drawing wherein:

Figure 1 is a fragmentary side view of a detachable spring and axle assembly constructed in accordance with the teachings of the present invention shown in operative relation with a vehicle;

Figure 2 is a plan view of the attachment shown in Figure 1;

Figure 3 is a perspective view of one of the spring-receiving boxes utilized in my invention; and Figure 4 is an enlarged fragmentary plan view of a portion of the apparatus shown in Figure 2 depicting the means for detachably securing the king pin of a vehicle.

Referring now to the drawing, and initially to Figure 1 thereof, the reference numeral 10 designates generally the new and novel load-bearing spring and axle assembly of the present invention which is adapted to be attached to a vehicle 11. In the drawing the vehicle 11 is shown to be a truck or trailer but it should be understood that the assembly 10 is not limited to such an application but, in fact, is adaptable to generally all types of automotive vehicles and trailers.

In accordance with usual practice, the vehicle 11 comprises an elongated frame 12 which is supported on a pair of transversely spaced semi-elliptical spring assemblies 13. Each of the spring assemblies 13 is pliably connected at its ends by shackles 14 and 15 to a vehicle frame 12. A load-bearing axle 16 is located under the springs 13 intermediate the ends thereof and mounts a pair of pneumatic tire assemblies 17. The axle 16 is secured to the springs 13 by a plurality of spaced U-bolts 18 which encircle and encompass the axle 16 and the assembled leaves of the springs 13. Suitable pads 19 and 20 are provided with each pair of U-bolts associated with one of the springs 13 to properly space and align the same with the pad 20 acting as a bearing surface for the nuts of the U-bolts 18.

In addition to the above, I provide certain other pieces of equipment which are attached to the frame 12 and the axle 16 of the vehicle. Rigidly secured to the bottom face of the rearmost portion of the frame 12 by welding or some other means is a plate 21 which extends beyond the frame 12 and has an upturned end portion 22. Secured to the plate 21 at the front edge thereof are a pair of transversely spaced stopping lugs 23. Also rigidly attached to the plate 21 near the middle thereof is a downwardly depending king pin 24 which serves as the male portion of a fifth wheel assembly for attaching the new and novel load-bearing spring and axle assembly to the vehicle as will be further described. The auxiliary equipment mounted on the axle 16 consists of a pair of spring-receiving boxes 25, one of which is shown in detail in Figure 3 of the drawing. Each of the spring-receiving boxes 25 has a bottom plate 26 with four apertures 27 therein and a downturned edge portion 28, a pair of side walls 29, and a rear wall 30. The side walls 29 have splayed and tapered front end portions 31 while the top edges 32 thereof are formed with a curvature having the same radius as the axle 16. The arrangement is such that one of the spring-receiving boxes 25 is adapted to be held in position directly under each of the springs 13 by a pair of U-bolts 33 while the top edges 32 of the side walls 29 nest directly against the axle 16. The spring-receiving boxes 25 are oriented so that the splayed and tapered portions 31 of the side walls 29 face toward the rear of the vehicle 11. Although the axle 16 in the illustrated embodiment is circular in cross section, many vehicles have axles of other shapes, square for example, and the spring-receiving boxes 25 may be adapted for attachment to such axles by making the top edge portions 32 of the side walls 29 conform generally to the cross section of the axle.

The detachable load-bearing spring and axle assembly 10 of my invention comprises an axle 34 mounting at both ends wheel assemblies 35 in a conventional and well known manner. Depending from the axle 34 are a second pair of transversely spaced spring-receiving boxes 36, said boxes being substantially the same as the boxes 25 although not embodying downturned front edges and being oriented in a direction facing the vehicle 11. In the manner previously described these spring-receiving boxes 36 are held in nesting relation against the axle 34 by numerous U-bolts 37. The rear set of ends of a pair of semi-elliptical springs 38 are retained in the boxes 36 while these springs extend forwardly of the axle 34 in generally parallel relation. The springs are joined intermediate their ends to a large rectangular bolster block 39 and the transversely extending rod 40. This is accomplished by providing a fitting for each of the springs 38 which comprises a top pad 41 and a bottom yoke member 42 which are clamped on the spring 38 by the U-bolts 43. The two fittings are spanned by the rod 40 which protrudes through the holes in the bottom yoke members 42 and is secured, by welding or brackets, for example, to the bottom face of the bolster block 39. The bolster block 39, springs 38, and axle 34 form a generally rectangular structure which is characterized by strength and rigidity as is apparent.

To further support and hold the springs 38 and axle 34 in proper relation during braking and other times when relatively high stresses are evident, such as when moving over extremely rough terrain, I provide a pair of stabilizing rods 44, each of which is pivotally connected on one end to the bolster block 39 near the top edge thereof by the brackets 45. The other end of each of the stabilizing rods 44 is pivotally connected at the apex portions of the triangularly shaped members 46 which in turn are secured to the axle 34. I also provide a pair of torque rods 47 positioned directly below the stabilizing rods 44 and extending from the axle 34 to the bolster block 39. Each of the rods is pivotally connected to the bolster block 39 on one end by brackets 48 and to the axle 34 on the other end by the brackets 49. By the utilization of this construction the springs 38 are forcibly retained in the spring-receiving boxes 36 and are prevented from undue movement when in operative relation with a vehicle as will be further explained.

The top face of the bolster block 39 is recessed intermediate the ends thereof at 50 as shown in Figures 2 and 4 of the drawing with a further depression 51 formed therein having a splayed trough 52 which terminates in a generally circular king pin-receiving concavity 53. A cover plate 54 is provided to cover a major portion of the recess 50 although the trough 52 and the concavity 53 are left exposed for ingress and egress of the king pin 24 attached to the vehicle 11. It is apparent that some means must be provided for blocking the concavity 53 from the trough 52 when the king pin 24 is in proper position and this is accomplished in the present instance by providing a hook-like member 55 which may be pivoted upon proper manipulation of a handle portion 56 about a pivot pin 57. In Figure 2 of the drawing the hook-like member 55 is shown blocking off the concavity 53. Upon movement of the handle 56 in the direction of the arrow the pin will be free to move from the depression 51, as is readily apparent. Thus, the king pin 24 acts as the male portion of a fifth wheel assembly while the various depressions and the hook-like member form the female portion of such an assembly for attaching the novel load-bearing spring and axle assembly to the vehicle as will be hereinafter more fully explained.

Attention is drawn to the fact that any known and/or workable fifth wheel assembly may be employed in place of the various equipage disclosed herein for connecting the attachment to the vehicle. Many such mechanisms, well known in this particular art, have safety features and operational characteristics which may be desirable for incorporation with the apparatus herein disclosed.

A tapered bar 58 is attached along the front edge of the bolster block 39 and the bolster block has a pair of depressions 59 on either end thereof, said depressions being adapted to receive the stopping lugs 23 but being slightly larger than the lugs. Some means must be provided for supporting the load-bearing spring and axle assembly 10 in upstanding relation when the assembly is detached from a vehicle and I contemplate that this will be accomplished by providing a downwardly depending tubular member 60 welded to the bottom of the bolster block 39. Telescopically received in the tubular member 60 is a rod 61 having a foot 62 secured to the lower end thereof. Apertures are provided in both the tubular member 60 and the rod 61 in order that the foot 62 may be held in a plurality of vertical positions by the insertion of a suitable pin between coincident apertures in said members. In Figure 1 of the drawing the foot is shown in a retracted position by the solid lines and in the extended position by the broken lines.

Considering now the operation and utilization of the new and novel load-bearing spring and axle assembly, it is assumed that the apparatus is initially detached from the vehicle with the foot 61 in the extended position thereby supporting the attachment in upstanding relation and that the hook-like member 55 is in such a position to expose to concavity 53. When it is desirable to attach the apparatus to the vehicle the driver aligns the vehicle and backs the same toward the assembly. It is contemplated that the level of the top of the bolster block 39 will be slightly above the plane of the bottom of the vehicle frame, one or two inches, for example, and as the vehicle moves toward engagement with the attachment the tapered bar 58 and the upturned end portion 22 of the plate 21 will cooperate to let the vehicle ride up over the bolster plate 39. Vertical alignment is further insured by the downturned edge portions 28 of the spring-receiving boxes 25.

As the vehicle moves over the bolster box 39 the king pin 24 moves into the splayed trough 52 and eventually seats in the circular concavity 53. When this is taking place the forward ends of the semi-elliptical springs 38 are moving into the spring-retaining boxes 25 until they abut against the rear walls 30. Also, the stopping lugs 23 move into cooperating relation with the recesses 59 and it should be apparent that the splayed portions of the trough 52 and the spring-retaining boxes 25 as well as the size of the depressions 59 serve to properly align the attachment with the vehicle laterally.

The handle 56 is then manipulated to close off the concavity 53 and the king pin 24 as hereinbefore explained and the foot 62 is retracted upwardly out of interfering relation with the rest of the apparatus and the vehicle is equipped with a load-bearing axle.

With the spring and axle assembly thus attached, any load carried by the vehicle will be supported at three points near the rear thereof, namely at the ends of the springs 13 and at the middle of the springs 38 via the bolster block 39 and fifth wheel assembly. The load transmitted to the springs 13 will bear directly on the axle 16 while the resultant load on the springs 38 will be distributed between the axles 16 and 34. The proportion of the load carried by the axle 34 will depend primarily on the position of the means supporting the springs 38 intermediate their ends. If, for example, the rod 40 were moved toward the axle 34 with respect to the center of the springs 38, more of the load will be transferred to the axle 34. Thus, the axle 34 is operative to support a substantial and predetermined portion of the total load carried by the vehicle.

When the vehicle is moving with the load-bearing spring and axle assembly attached, there are times when the attachment assembly will tend to pull away from the vehicle. When going around curves the attachment will tend to swing out of line with the axle 16 but this is prohibited by the stopping lugs 23 in the recesses 59. As indicated previously, the recesses 59 are larger than the lugs 23 to permit only a predetermined amount of turning of the attachment. Of course, the meeting corners of the recesses and the lugs will be rounded off and shaped as best suited for this use. The side walls 29 of the spring-receiving boxes 25 further tend to prevent undue lateral or pivotal movement of the attachment. The inertia of the attachment will tend to pull the assembly away from or push it toward the vehicle during accelerating and decelerating operations, respectively, but this is curtailed by the fifth wheel assembly and the spring-retaining boxes 25.

To disconnect the attachment, the foot 62 is lowered to the ground and the handle 56 moved to allow the vehicle to be pulled away. Attention is drawn to the fact that the attachment and detachment procedures are of the utmost simplicity and require a minimum of time and effort to complete.

The detachability of the load-bearing spring and axle assembly is especially important. When hauling a material of relatively high density, such as steel or iron, the apparatus allows better utilization of the load-carrying capacity of the vehicle. However, when a light material is being transported the extra or auxiliary axle is not required and the same may be easily removed. In addition, various state laws increase the utility of the assembly. As an example, one state may have weight and load limits per axle which are much lower than those of adjoining states and the load-bearing spring and axle assembly may be used when traversing the state having the low maximum load restrictions to comply with the law.

In many installations of this kind, it may be desirable to provide the load-bearing spring and axle assembly with braking means and this can be accomplished by the addition of auxiliary apparatus conventional in that particular art.

Thus, it should be apparent that I have accomplished the objects initially set forth by providing a detachable load-bearing spring and axle assembly for vehicles which supports a major portion of the load and is adaptable for use with any type of vehicle or trailer.

The assembly is especially well adapted for use with existing vehicles as all that is required is the addition of the lugs, a king pin, and the spring-receiving boxes. The assembly is restrained from yawing or undue movement in a simplified and expedient manner which enhances the use of the same.

Since many changes may be made in the illustrated embodiment of the invention without departing from the teachings thereof, reference should be had to the following appended claims in determining the full scope of my invention.

I claim:

1. An attachment for a vehicle which comprises at least one load-bearing axle, a pair of transversely spaced springs, means attaching the rear ends of said springs to said axle, means interconnecting said springs intermediate their ends, said means comprising a bolster block, said springs secured to said block, said block mounting releasable means for securing said attachment to a vehicle, means on an axle of a vehicle for detachably holding said springs whereby a load centered on said means interconnected is distributed between said first and second mentioned axles when said attachment is in operative relation with said vehicle, said means for detachably holding comprising a pair of spring-receiving boxes, each of said boxes comprising a bottom plate and a pair of side walls, the edges of said side walls having an outline substantially conforming with the peripheral outline of said axle of said vehicle, said side walls being splayed a portion of length, and means securing said spring-receiving boxes to said axle of said vehicle whereby said boxes nest thereagainst.

2. Apparatus according to claim 1 further characterized in that said securing means comprises a plurality of U-bolts encircling said axle.

3. An attachment for a vehicle comprising a load-bearing axle, a pair of transversely spaced springs, means attaching the rear ends of said springs to said axle, means carried by said springs for detachably securing said attachment to a vehicle, means on an axle of said vehicle for holding said springs when said attachment is in operative relation with said vehicle, said means for holding comprising a pair of spring-receiving boxes on said axle of said vehicle, each of said boxes having a flat bottom plate and a pair of side walls, the top edges of said side walls having an outline substantially conforming with the peripheral outline of said axle of said vehicle, and means securing said spring-receiving boxes to said axle of said vehicle whereby said boxes nest thereagainst.

4. An attachment for detachably securing the end portion of a spring assembly to a load-bearing axle comprising a spring-receiving box having a flat bottom plate and a pair of side walls, the top edges of said side walls having an outline substantially conforming with the peripheral outline of said axle, means securing said box to said axle whereby said box nests with said axle, said side walls being splayed throughout a portion of their length toward one end thereof, and one end of said bottom plate being turned downwardly, the arrangement being such that said splayed portions of said side walls and said downwardly turned edge of said plate operative to guide the end of a spring assembly into said spring-receiving box.

5. An attachment for a vehicle which comprises at least one load-bearing axle, a pair of transversely spaced springs, means attaching the rear ends of said springs to said axle, means interconnecting said springs intermediate their ends, said means interconnecting comprising a bolster block, said springs secured to said block, said block mounting releasible means for securing said attachment to a vehicle, means on a spring-supported axle of a vehicle for detachably holding the forward ends of said springs whereby a load centered on said means interconnecting is distributed between said first and said second mentioned axles when said attachment is in operative relation with said vehicle, said attachment further comprising stabilizing and torque rods, said rods pivotally connected at one set of ends to said block, and said rods pivotally connected at their other set of ends to said first mentioned axle.

6. A detachable load-bearing spring and axle assembly for vehicles which comprises at least one load-bearing axle, a pair of spaced and generally parallel semi-elliptical spring assemblies having their rear end portions secured to said axle, clamping means secured to each of said spring assemblies intermediate the ends thereof, a transversely extending member being generally parallel to said load-bearing axle spanning said spring assemblies and secured at its ends to said clamping means, a transversely extending bolster block attached to and supported by said member, said bolster block mounting releasible means for securing said spring and axle assembly to a vehicle, means carried by a yieldably mounted axle of a vehicle for detachably receiving the front end portion of said spring assemblies, said assembly further comprising a downwardly depending tubular member secured to the bottom surface of said bolster block, a rod telescopically received in said tubular member, a foot mounted on the lower end of said rod, a plurality of apertures in said rod and tubular member, and the arrangement being such that said foot forms a retractable support for supporting said spring and axle assembly.

7. A detachable load-bearing spring and axle assembly for vehicles which comprises at least one load-bearing axle, a pair of spaced and generally parallel semi-elliptical spring assemblies having their rear end portions secured to said axle, clamping means secured to each of said spring assemblies intermediate the ends thereof, a transversely extending member being generally parallel to said load-bearing axle spanning said spring assemblies and secured at its ends to said clamping means, a transversely extending boltser block attached to and supported by said member, said bolster block mounting releasible means for securing said spring and axle assembly to a vehicle, means carried by a yieldably mounted axle of a vehicle for detachably receiving the front end portions of said spring assemblies, said bolster assembly having a pair of transversely spaced recesses in the top surface thereof, a pair of lugs attached to the rear end portion of said vehicle, and said lugs adapted to be received in said recesses when said assembly is in attached relation with said vehicle and operative to limit pivotal lateral movement of said assembly.

8. A detachable load-bearing spring and axle assembly for vehicles which comprises at least one load-bearing axle, a pair of spaced and generally parallel semi-elliptical spring assemblies having their rear end portions secured to said axle, clamping means secured to each of said spring assemblies intermediate the ends thereof, a transversely extending member being generally parallel to said load-bearing axle spanning said spring assemblies and secured at its ends to said clamping means, a transversely extending bolster block attached to and supported by said member, said bolster block mounting releasible means for securing said spring and axle assembly to a vehicle, means carried by a yieldably mounted axle of a vehicle for detachably receiving the front end portions of said spring assemblies, the forward edge portion of said bolster block being downwardly inclined, the rear end portion of said vehicle mounting a rearwardly extending plate having an upwardly inclined rear edge portion, and said downwardly inclined forward edge portion of said bolster block and said upwardly inclined portion of said plate defining cooperating surfaces for guiding during attachment of said assembly to said vehicle.

9. An auxiliary quick-detachable load-bearing axle and spring assembly for a load-bearing road vehicle of the kind having a longitudinally disposed frame and a transverse load-bearing axle adjacent the rear end of said frame comprising in combination a horizontally disposed bolster plate on the underside of said frame rearwardly of said transverse axle, means rigidly connected with said transverse axle to provide a pair of transversely spaced connecting devices open to the rear, an auxiliary axle for a pair of road-engaging wheels, a spring assembly connected to said auxiliary axle at transversely spaced points and having a pair of forwardly extending members adapted to be interlocked with said connecting devices upon rearward movement of the vehicle relative to said auxiliary axle and spring assembly, a bolster centrally supported on said spring assembly and adapted to slide under said plate upon said rearward movement of the vehicle relative to said auxiliary axle and spring assembly, and releasible means to secure the auxiliary axle, spring and bolster assembly against rearward movement relative to said vehicle.

10. Apparatus according to claim 9 further characterized in that said releasible means comprises a king pin rigidly secured to the frame of the vehicle and extending downwardly from said plate, said bolster having a splayed trough in its forward portion to receive said pin upon rearward movement of the vehicle relative to said bolster, and releasible means to retain said pin in said trough.

11. Apparatus according to claim 9 further characterized in that said spring assembly comprises a pair of transversely spaced but longitudinally extending leaf springs, said forwardly extending members being comprised of the forward ends of said springs, and said connecting devices comprising box-like receptacles open to the rear to slideably receive said forward ends of said springs.

References Cited in the file of this patent

UNITED STATES PATENTS

| | | |
|---|---|---|
| 1,881,070 | Falk | Oct. 4, 1932 |
| 2,144,435 | Wicker | Jan. 17, 1939 |
| 2,434,304 | Wilson | Jan. 13, 1948 |
| 2,760,784 | Talbert | Aug. 28, 1956 |